United States Patent
Hao

(10) Patent No.: US 11,050,337 B1
(45) Date of Patent: Jun. 29, 2021

(54) VOLTAGE REGULATION CONTROL SYSTEM AND CONTROL METHOD THEREOF

(71) Applicant: HUIZHOU YOUWEI CHUANGKE ELECTRONICS CO., LTD, Huizhou (CN)

(72) Inventor: Chun Rong Hao, Shenzhen (CN)

(73) Assignee: HUIZHOU YOUWEI CHUANGKE ELECTRONICS CO., LTD, Huizhou (CN)

( * ) Notice: Subject to any disclaimer, the term of this patent is extended or adjusted under 35 U.S.C. 154(b) by 0 days.

(21) Appl. No.: 17/195,608

(22) Filed: Mar. 8, 2021

(30) Foreign Application Priority Data

Feb. 5, 2021 (CN) .......................... 202110163533.1

(51) Int. Cl.
*H02M 1/00* (2006.01)
*H02M 3/158* (2006.01)

(52) U.S. Cl.
CPC ............. *H02M 1/00* (2013.01); *H02M 3/158* (2013.01); *H02M 1/0003* (2021.05)

(58) Field of Classification Search
CPC .... H02M 1/00; H02M 1/0003; H02M 1/0006; H02M 1/0025; H02M 3/155; H02M 3/156; H02M 3/158
See application file for complete search history.

(56) References Cited

U.S. PATENT DOCUMENTS

| 5,189,599 A * | 2/1993 | Messman | H02M 3/33507 348/E3.035 |
| 5,963,437 A * | 10/1999 | Sekiya | H02M 3/33569 363/131 |
| 2002/0039298 A1* | 4/2002 | Riggio | H02M 1/4258 363/22 |
| 2011/0058842 A1* | 3/2011 | Kim | G03G 15/80 399/88 |

FOREIGN PATENT DOCUMENTS

CN 108258922 * 7/2018 ............. H02M 7/12

* cited by examiner

*Primary Examiner* — Matthew V Nguyen

(57) ABSTRACT

The present disclosure provides a voltage regulation control system including a high voltage generator, a positive and negative high voltage control circuit, a first coupling filter circuit, a second coupling filter circuit, a positive high voltage regulating unit, and a DC component control unit. The first coupling filter circuit includes a first AC coupling unit and a first rectifier filter unit. The second coupling filter circuit includes a second AC coupling unit and a second rectifier filter unit. A high voltage winding of a high voltage transformer of the high voltage generator is respectively connected to the first coupling filter circuit and the second coupling filter circuit. The positive and negative high voltage control circuit is respectively connected to the DC component control unit and the positive high voltage regulating unit. The first coupling filter circuit is connected to the positive high voltage regulating unit.

6 Claims, 2 Drawing Sheets

VOLTAGE REGULATION CONTROL SYSTEM AND CONTROL METHOD THEREOF

TECHNICAL FIELD

The present disclosure relates to a laser printing control system, in particular to a voltage regulation control system and a control method thereof.

BACKGROUND

In equipment such as laser printers, multiple independent and adjustable high-voltage direct current (DC) power supplies are usually required. Each high-voltage DC power supply is generated by a controlled electronic high-voltage generator. Therefore, multiple independently controlled electronic high-voltage generators are required. The electronic high-voltage generators generally comprises high-voltage transformers, high-power transistors and other relatively large and costly components. Such multiple independent high-voltage generators composed of multiple independent adjustable high-voltage DC power supplies have disadvantages of complex structure, large volume and high cost.

SUMMARY

An objective of the present disclosure is to provide a wide-range voltage regulation control system to solve problems in the prior art.

In order to achieve the above objectives, the present disclosure provides following technical solutions.

The present disclosure provides a voltage regulation control system. The voltage regulation control system comprises a high voltage generator, a positive and negative high voltage control circuit, a first coupling filter circuit, a second coupling filter circuit, a positive high voltage regulating unit, and a direct current (DC) component control unit.

The first coupling filter circuit comprises a first alternating current (AC) coupling unit and a first rectifier filter unit. The second coupling filter circuit comprises a second AC coupling unit and a second rectifier filter unit. A high voltage winding of a high voltage transformer of the high voltage generator is respectively connected to the first coupling filter circuit and the second coupling filter circuit. The positive and negative high voltage control circuit is respectively connected to the DC component control unit and the positive high voltage regulating unit. The first coupling filter circuit is connected to the positive high voltage regulating unit. The second coupling filter circuit is connected to the DC component control unit. The second coupling filter circuit and the positive high voltage regulating unit are connected at a positive and negative high voltage output end. The positive and negative high voltage output end is connected to the positive and negative high voltage control circuit through a voltage feedback circuit.

The first coupling filter circuit comprises a first capacitor, a second capacitor, a first diode, a second diode, a first resistor, and a first zener diode. One end of the first capacitor is connected to one end of the high voltage winding of the high voltage transformer of the high voltage generator. Another end of the first capacitor is connected to a cathode of the first diode and an anode of the second diode. An anode of the first diode is grounded. A cathode of the second diode is connected to one end of the first resistor. Another end of the first resistor is connected to the second capacitor and a cathode of the first zener diode. Another end of the second capacitor is grounded. An anode of the first zener diode is grounded. A cathode of the first zener diode is connected to an input end of the positive high voltage regulating unit.

The second coupling filter circuit comprises a third capacitor, a fourth capacitor, a fifth capacitor, a third diode, and a fourth diode. One end of the third capacitor is connected to one end of the high voltage winding of the high voltage transformer of the high voltage generator. Another end of the third capacitor is connected to an anode of the third diode and a cathode of the fourth diode. A cathode of the third diode is connected to one end of the fourth capacitor; another end of the fourth capacitor is grounded. An anode of the fourth diode is connected to one end of the fifth capacitor, another end of the fifth capacitor is grounded, and an anode of the fourth diode is connected to the positive and negative high voltage output end.

The positive and high voltage regulating unit comprises a second zener diode, a second resistor, a photocoupler, a plug-and-play (PNP) transistor assembly, and a first resistor assembly. The PNP transistor assembly comprises a first PNP transistor, a second PNP transistor. The first resistor assembly comprises a third resistor. A cathode of the second zener diode is connected to an output end of the positive and negative high voltage control circuit. An anode of the second zener diode is connected to one end of the second resistor. Another end of the second resistor is connected to an anode of one diode of the photocoupler. A cathode of the diode of the photocoupler is grounded. A collector of the photocoupler is connected to the first coupling filter circuit and the second coupling filter circuit. The collector of the photocoupler is connected to an emitter of the first PNP transistor. An emitter of the photocoupler is connected to a base of the first PNP transistor. A collector of the first PNP transistor is connected to an emitter of the second PNP transistor. Two ends of the third resistor are respectively connected to a base of the first PNP transistor and a base of the second PNP transistor. Bases of the PNP transistor assembly and collectors of the PNP transistor assembly are respectively connected to different resistors. The PNP transistor assembly and the first resistor assembly are arranged at intervals. One transistor disposed on a tail end of the PNP transistor assembly is connected to the positive and negative high voltage output end.

The DC component control unit comprises a third PNP transistor, a fourth PNP transistor, a fourth resistor, a fifth resistor, a sixth resistor, a seventh resistor, a transistor assembly, and a second resistor assembly. The transistor assembly comprises a first transistor and a second transistor. One end of the fourth resistor is connected to an output end of the positive and negative high voltage control circuit. Another end of the fourth resistor is connected to a base of the third PNP transistor. One end of the fifth resistor is connected to a reference voltage. Another end of the fifth resistor is connected to a base of the third PNP transistor. An emitter of the third PNP transistor is connected to the reference voltage. A collector of the third PNP transistor is connected to one end of the sixth resistor. Another end of the sixth resistor is connected to a base of the fourth PNP transistor. One end of the seventh resistor is connected to a base of the fourth PNP transistor. Another end of the seventh resistor is grounded. An emitter of the fourth PNP transistor is grounded. A collector of the four PNP transistor is connected to a base of the first transistor. An emitter of the first transistor is grounded. A collector of the first transistor is connected to an emitter of the second transistor. One end of the eighth resistor is connected to the first transistor.

Another end of the eighth resistor is connected to a base of the second transistor. One end of the ninth resistor is connected to a base of the second transistor. One end of one resistor disposed on a tail end of the second resistor assembly is connected to the third diode. Another end of the one resistor disposed on the tail end of the second resistor assembly is connected to a base of one PNP transistor of the second transistor assembly dispose at a tail end. A collector of the one PNP transistor of the second transistor assembly dispose at the tail end is connected to a cathode of the third diode. An emitter of the one PNP transistor of the second transistor assembly dispose at the tail end is connected to a collector of an adjacent PNP transistor on a front side of the one PNP transistor of the second transistor assembly. A base of the one PNP transistor of the second transistor assembly dispose at the tail end is connected to one end of an adjacent resistor on a front side of the one PNP transistor of the second transistor assembly. Another end of the adjacent resistor is connected to a base of an adjacent PNP transistor on a front side of the adjacent resistor.

A control method of the above mentioned voltage regulation control system, comprises steps:

generating a high voltage by the high voltage generator; generating a positive high voltage through the first coupling filter circuit by the high voltage winding of the high voltage transformer of the high voltage generator; generating a negative high voltage through the second coupling filter circuit by the high voltage winding of the high voltage transformer of the high voltage generator; wherein a voltage value of the generated positive high voltage is greater than an upper limit voltage value of an output voltage adjustment range of the voltage regulation control system; a voltage value of the generated negative high voltage is less than a lower limit voltage value of the output voltage adjustment range of the voltage regulation control system;

sending a pulse width modulation (PWM) voltage adjustment command by a positive and negative high voltage command input end to predetermine an output voltage;

simultaneously controlling the positive and high voltage regulating unit and the DC component control unit by the positive and negative high voltage control circuit according to the PWM voltage regulation instruction;

adjusting the voltage value of the positive high voltage by the positive high voltage regulator unit; adjusting an AC coupled DC component to adjust the voltage value of the negative high voltage by the DC component control unit; and sampling an output voltage of the voltage regulation control system by the positive and negative high voltage control circuit; confirming whether the sampled output voltage of the voltage regulation control system reaches a predetermined output voltage, adjusting the output voltage by forming a closed loop to obtain the required positive voltage or negative high voltage.

Compared with the prior art, the present disclosure adjusts the corresponding output positive negative high voltage or negative high voltage through the closed loop according to the commands, which has advantages of wide output range, strong load capacity, and low power consumption.

In the present disclosure, a single high-voltage generator is able to provide multi-channel adjustable wide-range positive and negative high voltages.

The present disclosure has high reliability, strong applicability, simple structure, low cost and is easy to implement.

DETAILED DESCRIPTION

Technical solutions in embodiments of the present disclosure will be clearly and completely described below in conjunction with accompanying drawings in the embodiments of the present disclosure. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

It should be understood in the description of the present disclosure that terms such as "central", "horizontal", "upper", "lower", "left", "right", "vertical", "horizontal", "top", "bottom", "inner", "outer", etc., indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure. In addition, the terms such as "first", "second" and "third" are only used for the purpose of description, rather than being understood to indicate or imply relative importance.

It should be noted in the description of the present disclosure that, unless otherwise regulated and defined, terms such as "installation," "bonded," and "bonding" shall be understood in broad sense, and for example, may refer to fixed bonding or detachable bonding or integral bonding, may refer to mechanical bonding or electrical bonding, and may refer to direct bonding or indirect bonding through an intermediate medium or inner communication of two elements. For those of ordinary skill in the art, the meanings of the above terms in the present disclosure may be understood according to concrete conditions.

Figure 1:
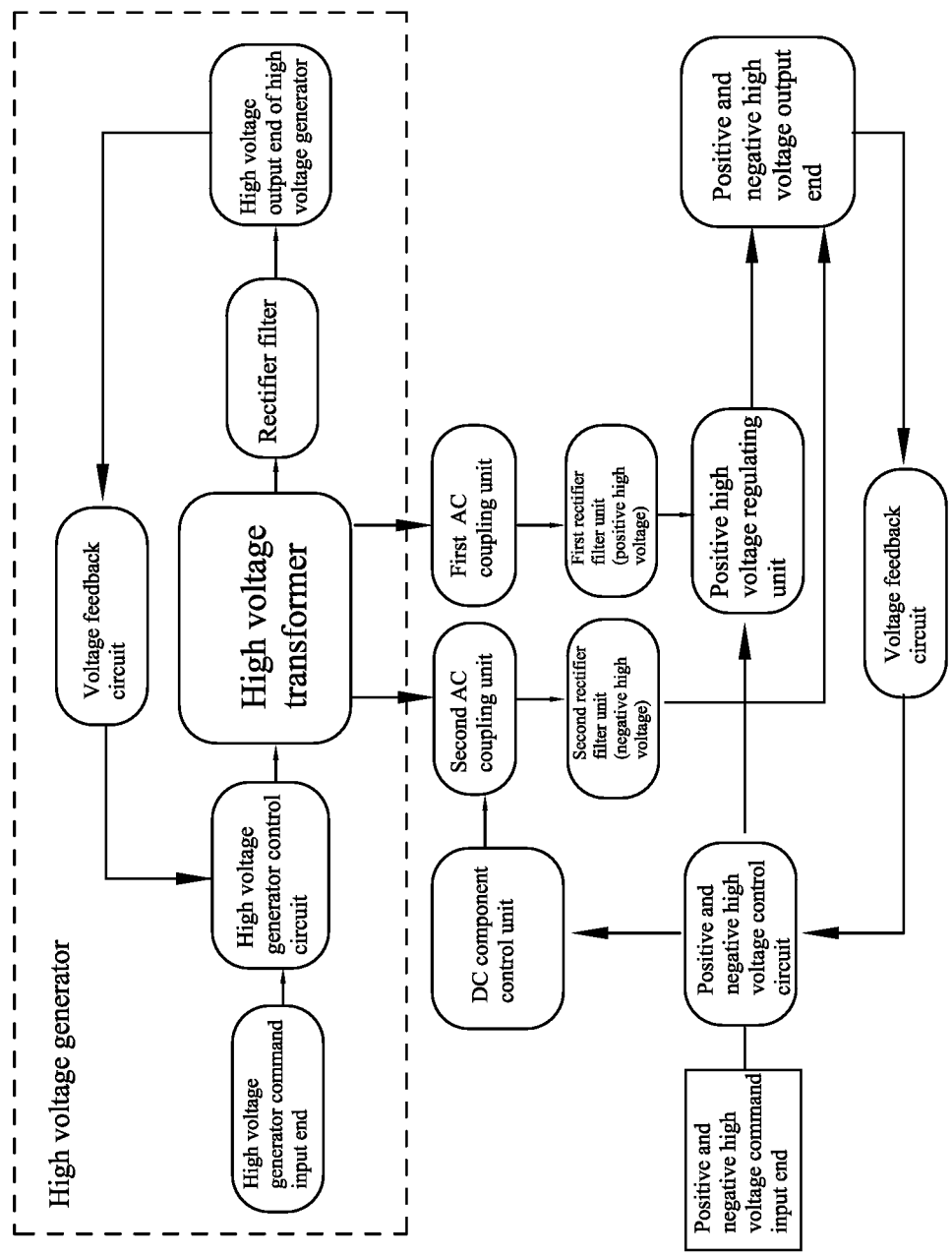
FIG. 1 is a schematic diagram showing a principle of a circuit of a voltage regulation control system of the present disclosure.
Figure 2:
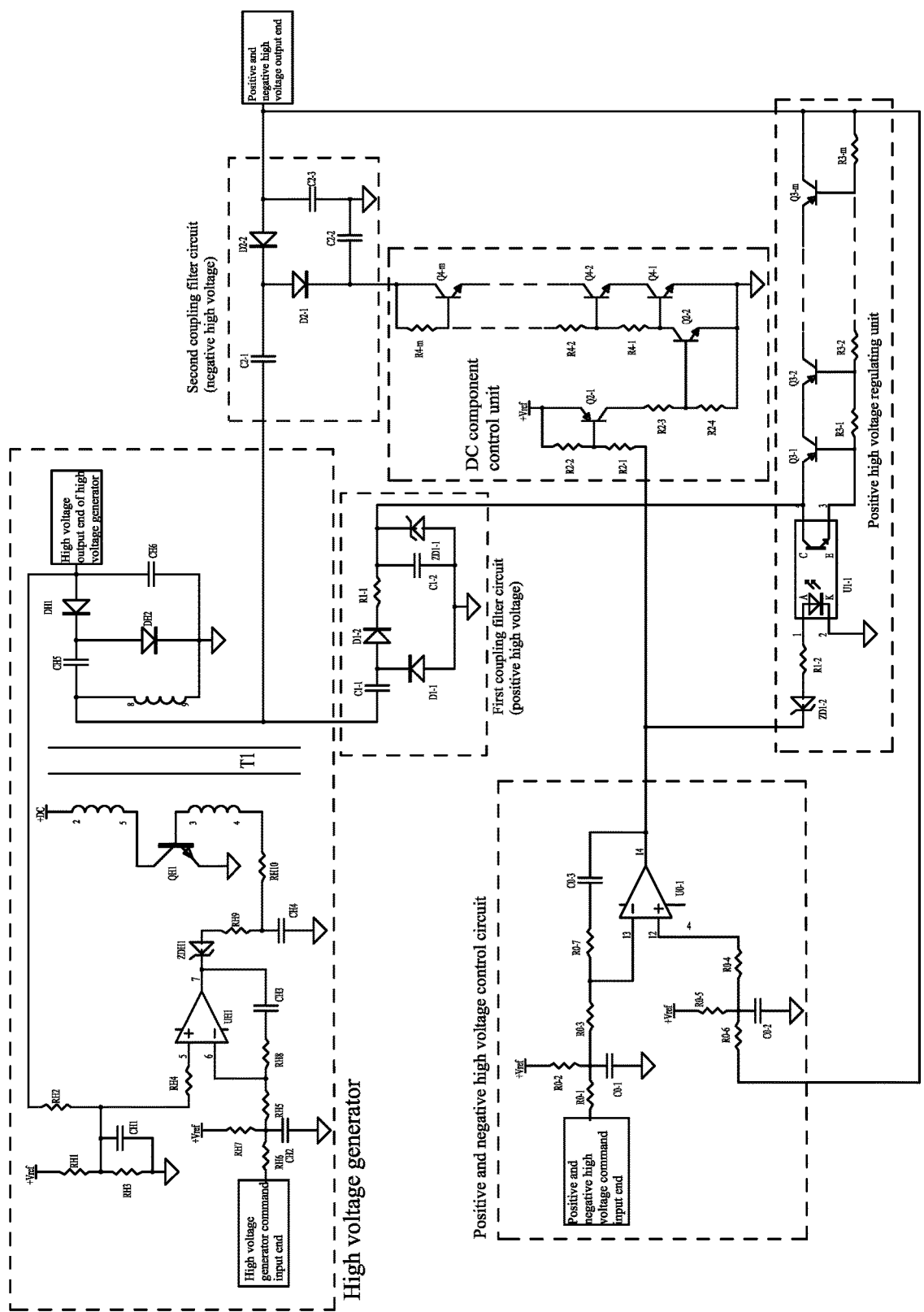
FIG. 2 is a schematic diagram of an overall circuit of the voltage regulation control system of the present disclosure.

As shown in FIGS. 1 and 2, in one embodiment, the present disclosure provides a voltage regulation control system. The voltage regulation control system comprises a high voltage generator, a positive and negative high voltage control circuit, a first coupling filter circuit, a second coupling filter circuit, a positive high voltage regulating unit, and a direct current (DC) component control unit.

The first coupling filter circuit comprises a first alternating current (AC) coupling unit and a first rectifier filter unit. The second coupling filter circuit comprises a second AC coupling unit and a second rectifier filter unit. A high voltage winding of a high voltage transformer of the high voltage generator is respectively connected to the first coupling filter circuit. The positive and negative high voltage control circuit is respectively connected to the DC component control unit and the positive high voltage regulating unit. The first coupling filter circuit is connected to the positive high voltage regulating unit. The second coupling filter circuit is connected to the DC component control unit. The second coupling filter circuit and the positive high voltage regulating unit are connected at a positive and negative high voltage output end. The positive and negative high voltage output end is connected to the positive and negative high voltage control circuit through a voltage feedback circuit.

The first coupling filter circuit comprises a first capacitor C1-1, a second capacitor C1-2, a first diode D1-1, a second diode D1-2, a first resistor R1-1, and a first zener diode ZD1-1. One end of the first capacitor C1-1 is connected to one end of the high voltage winding of the high voltage transformer of the high voltage generator. Another end of the first capacitor C1-1 is connected to a cathode of the first diode D1-1 and an anode of the second diode D1-2. An anode of the first diode D1-1 is grounded. A cathode of the second diode D1-2 is connected to one end of the first resistor R1-1. Another end of the first resistor R1-1 is connected to the second capacitor C1-2 and a cathode of the first zener diode ZD1-1. Another end of the second capacitor C1-2 is grounded. An anode of the first zener diode ZD1-1 is grounded. A cathode of the first zener diode ZD1-1 is connected to an input end of the positive high voltage regulating unit.

The second coupling filter circuit comprises a third capacitor C2-1, a fourth capacitor C2-2, a fifth capacitor C2-3, a third diode D2-1, and a fourth diode D2-2. One end of the third capacitor C2-1 is connected to one end of the high voltage winding of the high voltage transformer of the high voltage generator. Another end of the third capacitor C2-1 is connected to an anode of the third diode D2-1 and a cathode of the fourth diode D2-2. A cathode of the third diode D2-1 is connected to one end of the fourth capacitor C2-2, another end of the fourth capacitor C2-2 is grounded. An anode of the fourth diode D2-2 is connected to one end of the fifth capacitor C2-3, another end of the fifth capacitor C2-3 is grounded, an anode of the fourth diode D2-2 is connected to the positive and negative high voltage output end.

The positive and high voltage regulating unit comprises a second zener diode ZD1-2, a second resistor R1-2, a photocoupler U1-1, a plug-and-play (PNP) transistor assembly, and a first resistor assembly. The PNP transistor assembly comprises m PNP transistors, such as a first PNP transistor Q3-1, a second PNP transistor Q3-2 . . . and a $m^{th}$ PNP transistor Q3-$m$ (m is an integer no less than 1). The first resistor assembly comprises m resistors, such as a third resistor R3-1, R3-2; . . . and $(m+2)^{th}$ R3-$m$. A cathode of the second zener diode ZD1-2 is connected to an output end of the positive and negative high voltage control circuit. An anode of the second zener diode ZD1-2 is connected to one end of the second resistor R1-2. Another end of the second resistor R1-2 is connected to an anode of one diode of the photocoupler U1-1. A cathode of the diode of the photocoupler U1-1 is grounded. A collector of the photocoupler U1-1 is connected to the first coupling filter circuit (positive high voltage). The collector of the photocoupler U1-1 is connected to an emitter of the first PNP transistor Q3-1. An emitter of the photocoupler U1-1 is connected to a base of the first PNP transistor Q3-1. A collector of the first PNP transistor Q3-1 is connected to an emitter of the second PNP transistor Q3-2. Two ends of the third resistor R3-1 are respectively connected to a base of the first PNP transistor Q3-1 and a base of the second PNP transistor Q3-2. A base of the $m^{th}$ transistor is connected to one end of the $(m+1)^{th}$ resistor and one end of the $(m+2)^{th}$ resistor R3-$m$, the other end of the $(m+2)^{th}$ resistor R3-$m$ is connected to a collector of the $m^{th}$ PNP transistor, and an emitter of the $m^{th}$ PNP transistor is connected to a collector of a $(m-1)^{th}$ PNP transistor. The collector of the $(m-1)^{th}$ PNP transistor is connected to the positive and negative high voltage output end.

The DC component control unit comprises a third PNP transistor Q2-1, a fourth PNP transistor Q2-2, a fourth resistor R2-1, a fifth resistor R2-2, a sixth resistor R2-3, a seventh resistor R2-4, a transistor assembly, and a second resistor assembly. The transistor assembly comprises m transistors (m is an integer no less than 1), such as a first transistor Q4-1, a second transistor Q4-2 . . . and a $m^{th}$ transistor 4-$m$. The second resistor assembly R41 comprises in resistors, such as an eighth resistor R4-1, a ninth resistor R4-2 . . . and a mth resistor R4-$m$. The One end of the fourth resistor R2-1 is connected to an output end of the positive and negative high voltage control circuit. Another end of the fourth resistor R2-1 is connected to a base of the third PNP transistor Q2-1. One end of the fifth resistor R2-2 is connected to a reference voltage. Another end of the fifth resistor R2-2 is connected to a base of the third PNP transistor Q2-1. An emitter of the third PNP transistor Q2-1 is connected to the reference voltage +Vref A collector of the third PNP transistor Q2-1 is connected to one end of the sixth resistor R2-3. Another end of the sixth resistor R2-3 is connected to a base of the fourth PNP transistor Q2-2. One end of the seventh resistor R2-4 is connected to a base of the fourth PNP transistor Q2-2; another end of the seventh resistor R2-4 is grounded. An emitter of the fourth PNP transistor Q2-2 is grounded. A collector of the four PNP transistor Q2-2 is connected to a base of the first transistor Q4-1. An emitter of the first transistor Q4-1 is grounded. A collector of the first transistor Q4-1 is connected to an emitter of the second transistor Q4-2. One end of the eighth resistor R4-1 is connected to the first transistor Q4-1. Another end of the eighth resistor R4-1 is connected to a base of the second transistor Q4-2. One end of the ninth resistor R4-2 is connected to a base of the second transistor Q4-2. One end of $m^{th}$ resistor of is connected to a cathode of the third diode D2-1. Another end of $m^{th}$ resistor is connected to a base of $m^{th}$ transistor of the transistor assembly. A collector of the $m^{th}$ transistor of the transistor assembly is connected to a cathode of the third diode D2-1. An emitter of the re transistor of the transistor assembly is connected to the collector of the $(m-1)^{th}$ transistor of the transistor assembly, and a base of the $m^{th}$ transistor of the transistor assembly is connected to one end of the $(m-1)^{th}$ resistor. The other end of the $(m-1)^{th}$ resistor is connected to the base of the $(m-1)^{th}$ transistor of the transistor assembly. In the embodiment, the transistors of the transistor assembly are PNP transistors.

An emitter of the one transistor of the transistor assembly dispose at the tail end is connected to a collector of an adjacent transistor on a front side of the one transistor of the transistor assembly. A base of the one transistor of the transistor assembly dispose at the tail end is connected to one end of an adjacent resistor on a front side of the one transistor of the transistor assembly. Another end of the adjacent resistor is connected to a base of an adjacent transistor on a front side of the adjacent resistor.

A control method of the above mentioned voltage regulation control system, comprises steps:

Step 1: generating a high voltage by the high voltage generator; generating a positive high voltage through the first coupling filter circuit by the high voltage winding of the high voltage transformer of the high voltage generator; generating a negative high voltage through the second coupling filter circuit by the high voltage winding of the high voltage transformer of the high voltage generator; wherein a voltage value of the generated positive high voltage is greater than an upper limit voltage value of an output voltage adjustment range of the voltage regulation control system; a voltage value of the generated negative high voltage is less than a lower limit voltage value of the output voltage adjustment range of the voltage regulation control system;

Step 2: sending a pulse width modulation (PWM) voltage adjustment command by a positive and negative high voltage command input end to predetermine an output voltage;

Step 3: simultaneously controlling the positive and high voltage regulating unit and the DC component control unit by the positive and negative high voltage control circuit according to the PWM voltage regulation instruction;

Step 4: adjusting the voltage value of the positive high voltage by the positive high voltage regulator unit; adjusting an AC coupled DC component to adjust the voltage value of the negative high voltage by the DC component control unit; and Step 5: sampling an output voltage of the voltage regulation control system by the positive and negative high voltage control circuit; confirming whether the sampled output voltage of the voltage regulation control system reaches a predetermined output voltage, adjusting the output voltage by forming a closed loop to obtain the required positive voltage or negative high voltage.

In actual implementation, the present disclosure can also be extended to following applications:

1. Use the DC component control unit to control the DC component of AC to obtain adjustable high voltage.

2. The first coupling filter circuit (positive high voltage circuit) can be deleted, and the input end of the positive high voltage regulator unit is grounded to adjust a zero voltage to the negative high voltage.

3. The second coupling filter circuit (positive high voltage circuit) can be deleted, and the DC component control unit and the positive high voltage regulator unit are cooperated to adjust the zero voltage to the positive high voltage.

4. The adjustable high voltage of AC coupling is not limited to two, it can be single or multiple.

For those skilled in the art, it is obvious that the present disclosure is not limited to the details of the foregoing exemplary embodiments, and the present disclosure can be implemented in other specific forms without departing from the spirit or basic characteristics of the present disclosure. Therefore, from any point of view, the embodiments should be regarded as exemplary and non-limiting. The scope of the present disclosure is defined by the appended claims rather than the foregoing description, and therefore it is intended to fall within the protection scope. All changes within the meaning and scope of equivalent elements of are included in the present disclosure. Any reference signs in the claims should not be regarded as limiting the claims involved.

In addition, it should be understood that although the present disclosure is described in accordance with the implementation manners, not each implementation manner only includes an independent technical solution. This narration in the specification is only for clarity, and those skilled in the art should consider the specification as a whole. The technical solutions in the embodiments can also be appropriately combined to form other embodiments that can be understood by those skilled in the art.

What is claimed is:

1. A voltage regulation control system, comprising
a high voltage generator;
a positive and negative high voltage control circuit;
a first coupling filter circuit;
a second coupling filter circuit;
a positive high voltage regulating unit; and
a direct current (DC) component control unit;
wherein the first coupling filter circuit comprises a first alternating current (AC) coupling unit and a first rectifier filter unit; the second coupling filter circuit comprises a second AC coupling unit and a second rectifier filter unit; a high voltage winding of a high voltage transformer of the high voltage generator is respectively connected to the first coupling filter circuit and the second coupling filter circuit; the positive and negative high voltage control circuit is respectively connected to the DC component control unit and the positive high voltage regulating unit; the first coupling filter circuit is connected to the positive high voltage regulating unit; the second coupling filter circuit is connected to the DC component control unit; the second coupling filter circuit and the positive high voltage regulating unit are connected at a positive and negative high voltage output end; the positive and negative high voltage output end is connected to the positive and negative high voltage control circuit through a voltage feedback circuit.

2. The voltage regulation control system according to claim 1, wherein the first coupling filter circuit comprises a first capacitor, a second capacitor, a first diode, a second diode, a first resistor, and a first zener diode; one end of the first capacitor is connected to one end of the high voltage winding of the high voltage transformer of the high voltage generator; another end of the first capacitor is connected to a cathode of the first diode and an anode of the second diode: an anode of the first diode is grounded; a cathode of the second diode is connected to one end of the first resistor; another end of the first resistor is connected to the second capacitor and a cathode of the first zener diode; another end of the second capacitor is grounded; an anode of the first zener diode is grounded; a cathode of the first zener diode is connected to an input end of the positive high voltage regulating unit.

3. The voltage regulation control system according to claim 1, wherein the second coupling filter circuit comprises a third capacitor, a fourth capacitor, a fifth capacitor, a third diode, and a fourth diode; one end of the third capacitor is connected to one end of the high voltage winding of the high voltage transformer of the high voltage generator; another end of the third capacitor is connected to an anode of the third diode and a cathode of the fourth diode; a cathode of the third diode is connected to one end of the fourth capacitor; another end of the fourth capacitor is grounded; an anode of the fourth diode is connected to one end of the fifth capacitor; another end of the fifth capacitor is grounded; an anode of the fourth diode is connected to the positive and negative high voltage output end.

4. The voltage regulation control system according to claim 3, wherein the DC component control unit comprises a third PNP transistor, a fourth PNP transistor, a fourth resistor; a fifth resistor, a sixth resistor, a seventh resistor; a transistor assembly, and a second resistor assembly; the transistor assembly comprises a first transistor and a second transistor; one end of the fourth resistor is connected to an output end of the positive and negative high voltage control circuit; another end of the fourth resistor is connected to a base of the third PNP transistor; one end of the fifth resistor is connected to a reference voltage; another end of the fifth resistor is connected to a base of the third PNP transistor; an emitter of the third PNP transistor is connected to the reference voltage; a collector of the third PNP transistor is connected to one end of the sixth resistor; another end of the sixth resistor is connected to a base of the fourth PNP transistor; one end of the seventh resistor is connected to a base of the fourth PNP transistor; another end of the seventh resistor is grounded; an emitter of the fourth PNP transistor is grounded; a collector of the four PNP transistor is connected to a base of the first transistor; an emitter of the first transistor is grounded; a collector of the first transistor is connected to an emitter of the second transistor; one end of the eighth resistor is connected to the first transistor; another end of the eighth resistor is connected to a base of the second transistor; one end of the ninth resistor is connected to a base of the second transistor; one end of one resistor disposed on a tail end of the second resistor assembly is connected to the third diode; another end of the one resistor disposed on the tail end of the second resistor assembly is connected to a base of one PNP transistor of the second transistor assembly dispose at a tail end; a collector of the one PNP transistor of the second transistor assembly dispose at the tail end is connected to a cathode of the third diode; an emitter of the one PNP transistor of the second transistor assembly dispose at the tail end is connected to a collector of an adjacent PNP transistor on a front side of the one PNP transistor of the second transistor assembly; a base of the one PNP transistor of the second transistor assembly dispose at the tail end is connected to one end of an adjacent resistor on a front side of the one PNP transistor of the second transistor assembly; another end of the adjacent resistor is connected to a base of an adjacent PNP transistor on a front side of the adjacent resistor.

5. The voltage regulation control system according to claim 1, wherein the positive and high voltage regulating unit comprises a second zener diode, a second resistor, a photocoupler, a plug-and-play (PNP) transistor assembly, and a first resist, assembly; the PNP transistor assembly comprises a first PNP transistor and a second PNP transistor; the first resistor assembly comprises a third resistor; a cathode of the second zener diode is connected to an output end of the positive and negative high voltage control circuit; an anode of the second zener diode is connected to one end of the second resistor; another end of the second resistor is connected to an anode of one diode of the photocoupler; a cathode of the diode of the photocoupler is grounded; a collector of the photocoupler is connected to the first coupling filter circuit; the collector of the photocoupler is connected to an emitter of the first PNP transistor; an emitter of the photocoupler is connected to a base of the first PNP transistor; a collector of the first PNP transistor is connected to an emitter of the second PNP transistor; two ends of the third resistor are respectively connected to a base of the first PNP transistor and a base of the second PNP transistor; bases of the PNP transistor assembly and collectors of the PNP transistor assembly are respectively connected to different resistors; the PNP transistor assembly and the first resistor assembly are arranged at intervals; one transistor disposed on a tail end of the PNP transistor assembly is connected to the positive and negative high voltage output end.

6. A control method of a voltage regulation control system, comprising the voltage regulation control system; wherein the voltage regulation control system comprises a high voltage generator, a positive and negative high voltage control circuit, a first coupling filter circuit, a second coupling filter circuit, a positive high voltage regulating unit; and a direct current (DC) component control unit;

wherein the first coupling filter circuit comprises a first alternating current (AC) coupling unit and a first rectifier filter unit; the second coupling filter circuit comprises a second AC coupling unit and a second rectifier filter unit; a high voltage winding of a high voltage transformer of the high voltage generator is respectively connected to the first coupling filter circuit and the second coupling filter circuit; the positive and negative high voltage control circuit is respectively connected to the DC component control unit and the positive high voltage regulating unit; the first coupling filter circuit is connected to the positive high voltage regulating unit; the second coupling filter circuit is connected to the DC component control unit; the second coupling filter circuit and the positive high voltage regulating unit are connected at a positive and negative high voltage output end; the positive and negative high voltage output end is connected to the positive and negative high voltage control circuit through a voltage feedback circuit;

wherein the control method comprises steps:

generating a high voltage by the high voltage generator; generating a positive high voltage through the first coupling filter circuit by the high voltage winding of the high voltage transformer of the high voltage generator; generating a negative high voltage through the second coupling filter circuit by the high voltage winding of the high voltage transformer of the high voltage generator; wherein a voltage value of the generated positive high voltage is greater than an upper limit voltage value of an output voltage adjustment range of the voltage regulation control system; a voltage value of the generated negative high voltage is less than a lower limit voltage value of the output voltage adjustment range of the voltage regulation control system;

sending a pulse width modulation (PWM) voltage adjustment command by a positive and negative high voltage command input end to predetermine an output voltage;

simultaneously controlling the positive and high voltage regulating unit and the DC component control unit by the positive and negative high voltage control circuit according to the PWM voltage regulation instruction;

adjusting the voltage value of the positive high voltage by the positive high voltage regulator unit; adjusting an AC coupled DC component to adjust the voltage value of the negative high voltage by the DC component control unit; and sampling an output voltage of the voltage regulation control system by the positive and negative high voltage control circuit; confirming whether the sampled output voltage of the voltage regulation control system reaches a predetermined output voltage, adjusting the output voltage by forming a closed loop to obtain the required positive voltage or negative high voltage.

\* \* \* \* \*